United States Patent [19]

Maruyama et al.

[11] 4,338,421
[45] Jul. 6, 1982

[54] RESIN COMPOSITION

[75] Inventors: Takashi Maruyama, Toyonaka; Katsuji Ueno, Hirakata, both of Japan

[73] Assignee: Sumitomo Chemical Company, Limited, Osaka, Japan

[21] Appl. No.: 166,783

[22] Filed: Jul. 8, 1980

[30] Foreign Application Priority Data

Jul. 20, 1979 [JP] Japan ............................. 54-92998

[51] Int. Cl.$^3$ ..................... C08L 77/02; C08L 77/06; C08L 71/04
[52] U.S. Cl. ................................. 525/397; 525/905
[58] Field of Search ....................................... 525/397

[56] References Cited

U.S. PATENT DOCUMENTS 3,379,792  4/1968  Finholt ............................. 260/857 R

FOREIGN PATENT DOCUMENTS 53-47390   12/1978  Japan .
WO80/00349  3/1980  PCT Int'l Appl. ................. 525/397
1211863   11/1970  United Kingdom .
1334857   10/1973  United Kingdom .

Primary Examiner—Paul Lieberman
Attorney, Agent, or Firm—Stevens, Davis, Miller & Mosher

[57] ABSTRACT

A process for producing a resin composition which comprises melt-blending 30 to 95% by weight of a polyamide with 70 to 5% by weight of a polyphenylene oxide.

6 Claims, No Drawings

RESIN COMPOSITION

The present invention relates to a process for producing a resin composition comprising a polyphenylene oxide and a polyamide.

A polyphenylene oxide is a resin having excellent thermal, mechanical and electrical properties, and commercially it is blended with a styrene resin and put on the market as Noryl resin by General Electric Company. But, the polyphenylene oxide and its modified product, Noryl resin, have a drawback that they are poor in solvent resistance, and therefore their use for certain usages is limited at present irrespective of their excellent remaining characteristics. The improvement of the drawback is therefore strongly desired.

For the reasons as described above, the present inventors extensively studied to develop a polyphenylene oxide resin having an improved solvent resistance without causing a great damage to the characteristics inherent to the polyphenylene oxide.

As a result, in the compositions obtained by melt-blending polyphenylene oxides with polyamides, it was found that, when the polyamide content is in a specified range, not only the improvement in solvent resistance becomes remarkable but also the impact strength is improved.

In Japanese Patent Publication No. 997/1970 and U.S. Pat. No. 3,379,792, it was disclosed that the addition of a small amount of polyamide improves the melt flow property of polyphenylene oxide. In the specifications of the above patent publications, however, there is the description that, when a polyamide are adding to a polyphenylene oxide in an amount exceeding 20%, other characteristics of polyphenylene oxide begin to deteriorate to considerable extents. In view of these known facts, the findings by the present inventors are quite surprising.

An object of the present invention is to provide melt-blended resin compositions of polyphenylene oxides with polyamides and a process for producing the same.

Other objects and advantages of the present invention will be apparent from the following description.

According to this invention there is provided a process for producing a resin composition which comprises melt-blending 70 to 5% by weight of a polyphenylene oxide with 30 to 95% by weight of a polyamide.

It is generally believed that in blends of polyphenylene oxides with polyamides there is no compatibility between the two resins. In such a blend system, the interfacial adhesion between the two different type resins is poor, and consequently, phase separation of the resins occurs on molding, or the molded article is inferior in mechanical properties. Hence, such a blend is of no practical value. Nevertheless, according to the present invention, such problems are not found; on the contrary, the impact strength is improved. This fact was not anticipated from the above-mentioned conventional concept. From this fact, it may be considered that, in the process according to the present invention, some graft reaction takes place between the polyphenylene oxide and the polyamide on melt-blending. If this is true, the mechanism of the graft reaction may be considered as follows, though it is not limited thereto.

The active cites for the graft reaction may be the terminal phenolic hydroxy groups of polyphenylene oxide molecules or oxygen containing groups formed by side-reaction in the oxidation polymerization of the substituted hydrocarbon groups linked to the benzene rings in polyphenylene oxide molecules. For example, when the substituent is a methyl group, methylol or carboxyl group may be formed. The exchange reaction between these active cites and the amide groups may be caused by melt-blending the polyphenylene oxide with the polyamide, and thus the graft reaction may proceed.

The present invention will be illustrated in more detail.

In the present invention, the well-known polyphenylene oxides may satisfactorily be used. They can be easily produced by the methods disclosed in U.S. Pat. Nos. 3,306,875, 3,337,501 and 3,787,361.

For example, a polyphenylene oxide can be obtained by oxidation polymerization of a phenol compound represented by the general formula,

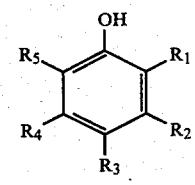

(wherein $R_1$, $R_2$, $R_3$, $R_4$ and $R_5$ are each a hydrogen atom, a halogen atom, a hydrocarbon radical, or a substituted hydrocarbon radical and at least one of them is a hydrogen atom), by oxygen or an oxygen-containing gas in the presence of a catalyst for oxidative coupling.

As specific examples of $R_1$, $R_2$, $R_3$, $R_4$ and $R_5$ in the above general formula, there may be given hydrogen, fluorine, chlorine, bromine, and iodine atoms, and methyl, ethyl, propyl, butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl, and ethylphenyl groups.

As specific examples of the phenol compound represented by the above general formula, there may be given phenol, o-, m-, and p-cresols, 2,6-, 2,5-, 2,4-, and 3,5-dimethylphenols, 2-methyl-6-phenylphenol, 2,6-diphenylphenol, 2,6-diethylphenol, 2-methyl-6-ethylphenol, and 2,3,5-, 2,3,6-, and 2,4,6-trimethylphenols. Two or more of these phenol compounds may be used in combination. In addition, it is also possible to apply the copolymerization of a phenol compound of the above general formula with a phenol compound not represented by the above general formula, for example, a dihydric phenol such as bisphenol-A, tetrabromobisphenol-A, resorcinol, or hydroquinone.

As catalysts used in the oxidation polymerization of the phenol compound, there is no particular limitation; and any catalysts for the oxidation polymerization can be employed. As typical examples of the catalyst, there may be given a catalyst comprising a cuprous salt and a tertiary amine, such as cuprous chloride-trimethylamine, cuprous acetate-triethylamine, or cuprous chloride-pyridine; a catalyst comprising a cupric salt, a tertiary amine, and an alkali metal hydroxide, such as cupric chloride-pyridine-potassium hydroxide; a catalyst comprising a manganese salt and a primary amine, such as manganese chloride-ethanolamine or manganese acetate-ethylenediamine; a catalyst comprising a manganese salt and an alcoholate or phenolate, such as manganese chloride-sodium methylate or manganese chloride-sodium phenolate; and a catalyst comprising a cobalt salt and a tertiary amine.

As specific examples of the polyphenylene oxide, there may be given, for example, poly(2,6-dimethyl-1,4-phenylene oxide), poly(2-methyl-1,4-phenylene oxide), poly(3-methyl-1,4-phenylene oxide), poly(2,6-diethyl-1,4-phenylene oxide), poly(2,6-dipropyl-1,4-phenylene oxide), poly(2-methyl-6-allyl-1,4-phenylene oxide), poly(2,6-dichloromethyl-1,4-phenylene oxide), poly(2,3,6-trimethyl-1,4-phenylene oxide), poly(2,3,5,6-tetramethyl-1,4-phenylene oxide), poly(2,6-dichloro-1,4-phenylene oxide), poly(2,6-diphenyl-1,4-phenylene oxide), and poly(2,5-dimethyl-1,4-phenylene oxide).

Copolymers of the phenol compounds also may be used.

A desirable form of the polyphenylene oxides used in the present invention includes those having oxidized hydrocarbon groups linked to benzene rings thereof. Polyphenylene oxides having oxidized hydrocarbon groups can be obtained by partial oxidation of hydrocarbon groups linked to benzene rings simultaneously with the oxidation polymerization of phenol compound. The amount of the hydrocarbon groups oxidized depends upon polymerization conditions to some extent; the main factors affecting said amount are the type and amount of catalyst, the partial pressure of oxygen, and the polymerization temperature and period. Further, the hydrocarbon groups may be oxidized positively by the use of an oxidizing agent after the polymerization has been finished.

The polyamide used in this invention is the one having

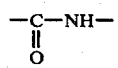

linkages in the main chain, which may be any polyamide that can be melted by heating. As typical examples thereof, there may be given 4-nylon, 6-nylon, 6,6-nylon, 12-nylon, and 6,10-nylon. In addition thereto, known transparent nylons may be used.

The composition of the present invention can be obtained by melt-blending 70 to 5% by weight of a polyphenylene oxide with 30 to 95% by weight of a polyamide. When the polyamide is less than 30% by weight, the molded article thereof undesirably has a low strength as well as unimproved solvent resistance. On the other hand, when the polyamide is more than 95% by weight, heat resistance is lowered to a great extent.

In the present invention, the temperature and period of melt-blending are also important factors for the purpose of obtaining a composition excellent in mechanical strength. The melt-blending temperature, though it varies depending upon the blending ratio of the polyphenylene oxide to the polyamide, is selected generally from the range of 180° to 350° C., preferably 200° to 330° C. Melt-blending temperatures below 180° C. tend to lower the strength of the composition. Temperature exceeding 350° C. are also undesirable because the polyphenylene oxide tends to become a gel type polymer. The melt-blending period, though it varies depending upon the melt-blending temperature, is selected generally from the range of 0.3 to 20 minutes, preferably 0.5 to 15 minutes, more preferably 1 to 10 minutes.

The melt-blending equipment may be of any type which is capable of treating a molten viscous mass and any system, a batch or continuous system, can be applied. As examples of the equipment, there may be given extruders, Banbury mixer, milling rolls, and kneaders.

It is possible to add fillers, plasticizers, flame retardants, or pigments such as other polymers, rubbery polymers, glass fiber, carbon fiber, carbon black, silica, $TiO_2$, etc. when the present invention is practiced.

In particular, it is desirable to add a styrene polymer in order to improve the processability. As specific examples of the styrene resin, there may be given polystyrene, and rubber-modified polystyrenes such as butadiene-based rubber-modified polystyrene, butadiene-based rubber-modified styrene-acrylonitrile copolymers, acryl rubber-modified polystyrenes, acryl rubber-modified styrene-acrylonitrile copolymers, ethylene-propylene rubber-modified polystyrenes, and ethylene-methylmethacrylate rubber-modified polystyrenes.

The present invention is illustrated in more detail by the following examples, but the invention is not limited to these examples.

EXAMPLE 1

Poly(2,6-dimethyl-1,4-phenylene oxide) (having an intrinsic viscosity of 0.55, measured in chloroform at 25° C.), which had been obtained by dissolving 2,6-dimethylphenol in benzene, adding manganese-ethanolamine complex thereto, and oxidizing the phenol compound, and 6,6-nylon (supplied by Toray Industries Inc.) were melt-blended in various ratios as shown in Table 1. The melt-blending was carried out at 300° C. for 10 minutes using a Brabender Plastograph. In order to examine solvent resistance of the compositions obtained by melt-blending in various compounding ratios, polyphenylene oxide homopolymer was extracted from the melt-blended compositions with chloroform. Also, Izod impact strength was tested in order to evaluate the mechanical strength. The results are shown in Table 1.

For comparison, the results of melt-blending the polyphenylene oxide with 10% by weight of nylon resin, which lies outside the scope of the present invention, are shown as Comparative Example 1 in Table 1. In addition, in order to demonstrate that only specified melt-blended compositions are excellent in solvent resistance and impact strength, the results of melt-blending 50% by weight of the above polyphenylene oxide and 50% by weight of polypropylene are also shown as Comparative Example 2 in Table 1.

TABLE 1

|  | Composition (weight ratio) | Percentage of fraction extracted with chloroform (wt %) | Izod impact strength (notched) (Kg . cm/cm$^2$) |
| --- | --- | --- | --- |
| Example 1 | Polyphenylene oxide/6,6-nylon = 3/7 | 0 | 5.3 |
| Example 2 | Polyphenylene oxide/6,6-nylon = 4/6 | 0 | 4.9 |
| Example 3 | Polyphenylene oxide/6,6-nylon = 5/5 | 0 | 4.3 |
| Example 4 | Polyphenylene oxide/6,6-nylon = 6/4 | 0 | 3.1 |
| Comparative Example 1 | Polyphenylene oxide/6,6-nylon = 9/1 | 81 | 0.7 |

TABLE 1-continued

| | Composition (weight ratio) | Percentage of fraction extracted with chloroform (wt %) | Izod impact strength (notched) (Kg . cm/cm²) |
|---|---|---|---|
| Example 2 | Polyphenylene oxide/Polypropylene = 5/5 | 45 | 0.3 |

What is claimed is:

1. A process for producing a resin composition which comprises melt-blending 30 to 95% by weight of a polyamide selected from the group consisting of 4-nylon, 6-nylon, 6,6-nylon, 12-nylon, and 6,10-nylon with 70 to 5% by weight of a polyphenylene oxide.

2. A process according to claim 1, wherein said polyphenylene oxide is prepared by oxidation polymerization of a phenol compound represented by the general formula,

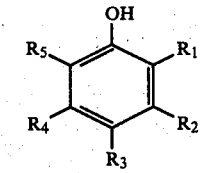

(wherein $R_1$, $R_2$, $R_3$, $R_4$, and $R_5$ are each hydrogen atom, a halogen atom, a hydrocarbon radical, or a substituted hydrocarbon radical and at least one of $R_1$ to $R_5$ is hydrogen atom).

3. A process according to claim 1, wherein the melt-blending period and temperature are 0.3 to 20 minutes and 180° to 350° C., respectively.

4. A process according to claim 3, wherein the melt-blending temperature is 200° to 330° C.

5. A process according to claim 3, wherein the melt-blending period is 0.5 to 15 minutes.

6. A resin composition produced by the process of any one of claims 1 to 5.